Feb. 23, 1926.
F. G. PURINTON
SEAL OR TAG AND METHOD OF APPLYING THE SAME
Filed May 26, 1925
1,573,861
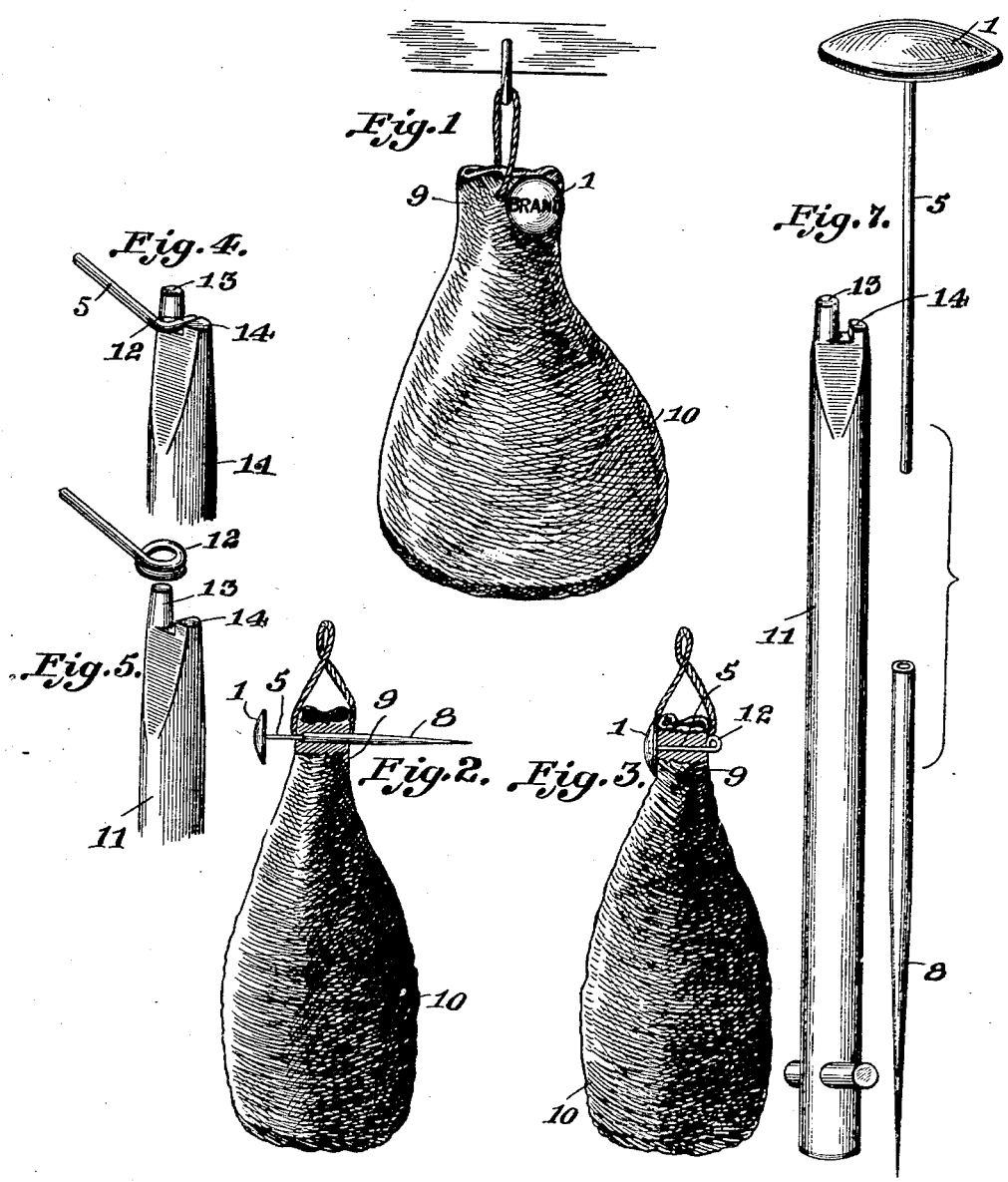
Inventor
Forrest G. Purinton
By Parker Cook
Attorney Patented Feb. 23, 1926.

1,573,861

UNITED STATES PATENT OFFICE.

FORREST G. PURINTON, OF WATERBURY, CONNECTICUT, ASSIGNOR TO THE PATENT BUTTON COMPANY, OF WATERBURY, CONNECTICUT, A CORPORATION OF CONNECTICUT.

SEAL OR TAG AND METHOD OF APPLYING THE SAME.

Application filed May 26, 1925. Serial No. 32,934.

*To all whom it may concern:*

Be it known that I, FORREST G. PURINTON, a citizen of the United States, residing at Waterbury, in the county of New Haven and State of Connecticut, have invented certain new and useful Improvements in Seals or Tags and Methods of Applying the Same, of which the following is a specification.

My invention relates to new and useful improvements in tags or seals and a method of applying the same to smoke meats, fresh meats, fowls or other forms of edibles, wherein the tag or seal may be quickly and readily applied to the meat or fowl and after once applied cannot be removed without breaking the tag or the shank thereof, thus prohibiting the removal of the tag without destroying the same.

One of the objects of the present invention is to provide a tag or seal in the form of a button or disk having a shank or prong of wire of limited ductility, the upper end of the shank being secured in the button in such a manner that it will be rigid enough to hold to the button in ordinary service, but will pull away from the shank if there is any great pressure exerted on the button to surreptitiously remove the same.

The shank is inserted in an awl which is then passed through the meat to be tagged, after which the awl is completely pulled through the meat and the lower end of the shank is curled preferably by a special form of wrench, thus tightly pulling the button against the meat and making it impossible for the shank to be pulled in either direction without either breaking off the button head or trying to uncurl the shank, and as the metal is of low ductility, should the curled portion try to be straightened, it will snap off and thus render the shank too short for future use.

Still another object of the invention is to provide a tag or seal wherein the top comprises a small wooden head which is provided with an opening for the reception of the shank, which shank is then preferably struck with a pointed instrument to swedge the upper edge of the shank to thus secure the same within the wooden button. After the head and shank are so assembled, a metal cap is placed over the wooden head, which cap is preferably of aluminum, and this metal cap may be ornamented or have other insignia thereon to denote the brand or style or grade of the goods.

With these and other objects in view, the invention consists in certain new and novel arrangements and combination of parts and methods of applying the article, as will be hereinafter more fully described and pointed out in the claims.

Referring now to the drawings showing a preferred embodiment of the invention,

Fig. 1 is a perspective view of a ham with the new form of tag attached thereto, Fig. 2 is a side elevation of a ham, a portion being shown in section and showing the initial step in tagging the ham, Fig. 3 is a similar view showing the completion of the application of the tag, Fig. 4 is a fragmentary detail showing the end of the wrench for the curling of the shank of the tag, Fig. 5 is a similar view, showing the completion of the curling of the shank, Fig. 6 is a detailed sectional view of the upper end of the seal or tag showing the manner of applying the shank to the same, and Fig. 7 shows a tag, the head being unornamented, and the tools necessary for applying the tag.

Referring now to Figs. 6 and 7, there is shown a wooden button or disk 1, which is preferably flat on its under surface as at 2, and has the concaved upper surface 3, although it will be appreciated that the configuration as well as the dimensions may be varied at will. In this button is provided a central opening 4 in which there is inserted a shank 5 preferably formed of slightly ductile aluminum so that when the metal is bent or curled when the seal is applied, it will retain its bent position, but if uncurled will quickly fatigue and snap off and then be too short for future use. To secure the shank 5 to the button, the upper end 6 is swedged within the opening 4 by striking the same with a sharply pointed instrument so that the walls will assume the position as may be clearly seen in Fig. 6.

After the shank is thus secured to the button, a metal cap 7 preferably of aluminum is tightly fitted over the button 1 and this cap 7 may have any ornamentation or insignia pressed therein as desired.

By so securing the shank to the button, it will be understood that the jointure is such that for all legitimate purposes the button and shank will remain in their assembled positions, but should any pressure be applied to the button, such as someone trying to remove the shank or button, the shank will tear from the button, as this jointure is the weakest part of the entire tag or seal.

It will be understood that other forms of jointure between the button and shank might be used, provided however, that any great pressure applied to the button head will tear it from the shank.

A simple way of applying this tag or seal, to the article to be branded is to provide an awl 8 which is hollow so that the shank 5 may be placed within the same, after which the awl will be passed through the narrow part or upper end 9 of the ham 10. After the ham is punctured, the awl will be continued to be pulled through the same and thus leave the shank 5 within the same and extending beyond its side. To completely fasten the tag as a whole to the ham, a wrench 11 is used to grasp the lower end of the shank 5, and the wrench then turned to form the curled portions 12 of the shank, thus pulling the head or button against the one side of the ham while the curled portion 12 contacts with the opposite side of the ham, as clearly shown in Fig. 3.

The wrench 11 is a specially formed one having the nib 13 and the little lug 14 at its end, so that the end of the shank may be quickly and rapidly curled, although small round nose pliers might also be used. However, the wrench shown will make a more even loop and may be used in a more rapid manner.

From the foregoing it will be seen that I have provided a novel means for tagging or branding food stuffs, such as fresh meat, smoked meats or fowl, and have also provided a means of tagging or sealing wherein if the tag or seal is tampered with, it will break and cannot to be reused.

Furthermore, the wire shank, as well as the metal cap of the button being made of aluminum will in no way contaminate the meat, and will meet with the rules of the meat inspectors. Furthermore, the wire shank is of low ductility, so that if anyone tries to straighten out the curls or loop on the outer end of the shank, the metal will snap and the shank will then be too short to be again used. Thus, both ends of the seal will be destroyed if they are tampered with.

It will be understood that the button head might be other than the wood with the metal cap, provided, however, the connection between the shank and the button head is the weak point, and will permit the shank to tear from the head if any pressure is put on the head to try and remove it from the article after being tagged.

Many slight changes might be made without in any way departing from the spirit and scope of the invention.

Having thus described my invention, what I claim as new and desire to secure by Letters Patent is:—

1. A seal for meats comprising a button provided with an aperture, a metal shank of limited ductility having its upper end swedged within said aperture, the joint formed by said swedging being relatively insecure, and the shank initially straight, the lower end of the shank adapted to be curled to pull the seal tightly in position, the ductility of the shank being such that the curl will break if straightened while the button will pull from the shank if the said shank is subjected to a retrogressive movement.

2. A seal comprising a head, a shank formed of metal of limited ductility and of the same diameter throughout its length, said shank fastened within the head in a relatively insecure manner, said shank being initially substantially straight, the lower end of the shank being deformed in its final position to pull the head tightly against the article to be sealed, said head adapted to tear from the shank if subjected to a retrogressive movement, and the deformed shank adapted to break if the same is subsequently straightened.

3. A seal or tag for meats comprising a shank of limited ductility and a head insecurely mounted thereon the lower end of the shank being curled to pull the head tightly against the article to be sealed, the curl adapted to break due to the limited ductility of the metal if the curl be subsequently straightened, the head adapted to tear from the shank if the shank is subjected to a retrogressive movement.

4. The method of applying a seal having a head and a shank insecurely fastened thereto, to meats and the like, comprising the placing of the shank of the seal within an awl, piercing the article to be tagged, removing the awl and curling the end of the shank to tightly pull the seal in position, the head of the seal adapted to break away from the shank if the shank is subjected to a retrogressive movement.

5. The method of applying a seal to meats and the like which consists in using a seal provided with a head having a shank insecurely fastened thereto, the said shank formed of metal of limited ductility, placing the shank within an awl, piercing the article to be tagged and curling the end of the shank to tightly pull the seal in position, the curled end adapted to break if subsequently straightened.

In testimony whereof I affix my signature.

FORREST G. PURINTON.